US007522309B2

(12) United States Patent
Nishikuni

(10) Patent No.: US 7,522,309 B2
(45) Date of Patent: Apr. 21, 2009

(54) IMAGE PROCESSING METHOD, IMAGE PROCESSING APPARATUS AND STORAGE MEDIUM STORING A PROGRAM

(75) Inventor: Yuichi Nishikuni, Ebina (JP)

(73) Assignee: Fuji Xerox Co. Ltd., Tokyo (JP)

( * ) Notice: Subject to any disclaimer, the term of this patent is extended or adjusted under 35 U.S.C. 154(b) by 631 days.

(21) Appl. No.: 11/223,925

(22) Filed: Sep. 13, 2005

(65) Prior Publication Data
US 2006/0209325 A1 Sep. 21, 2006

(30) Foreign Application Priority Data
Mar. 18, 2005 (JP) ............................. 2005-078795

(51) Int. Cl.
*G06F 15/00* (2006.01)
*G06K 15/00* (2006.01)
(52) U.S. Cl. ......................... 358/1.9; 358/2.1
(58) Field of Classification Search .................. 715/274
See application file for complete search history.

(56) References Cited

U.S. PATENT DOCUMENTS

2001/0035968 A1* 11/2001 Higashikata et al. ......... 358/1.9
2002/0122191 A1* 9/2002 Kitagawara .................. 358/1.9

FOREIGN PATENT DOCUMENTS

| JP | A 5-292306 | 11/1993 |
| JP | A 10-262157 | 9/1998 |
| JP | A 2002-10096 | 1/2002 |
| JP | A 2002-262113 | 9/2002 |

\* cited by examiner

*Primary Examiner*—Twyler L Haskins
*Assistant Examiner*—Barbara D Reinier
(74) *Attorney, Agent, or Firm*—Oliff & Berridge, PLC

(57) ABSTRACT

In an image processing method for generating an output color signal to reproduce an output image corresponding to an input image, reproducibility of a line segment in the output image is evaluated, and the output color signal based on the evaluation is generated.

16 Claims, 9 Drawing Sheets

FIG. 2A

EXAMPLE OF BLACK AMOUNT COEFFICIENT (IN THE CASE OF GRAPHICS)

| L \ C | 0 | 20 | 40 | 60 | 80 | 100 |
|---|---|---|---|---|---|---|
| 100 | 100 | 0 | 0 | 0 | 0 | 0 |
| 80 | 100 | 4 | 0 | 0 | 0 | 0 |
| 60 | 100 | 75 | 15 | 0 | 0 | 0 |
| 40 | 100 | 90 | 60 | 25 | 0 | 0 |
| 20 | 100 | 94 | 70 | 58 | 32 | 5 |
| 0 | 100 | 96 | 80 | 75 | 55 | 32 |

FIG. 2B

EXAMPLE OF BLACK AMOUNT COEFFICIENT (IN THE CASE OF IMAGES)

| L \ C | 0 | 20 | 40 | 60 | 80 | 100 |
|---|---|---|---|---|---|---|
| 100 | 0 | 0 | 0 | 0 | 0 | 0 |
| 80 | 9 | 0 | 0 | 0 | 0 | 0 |
| 60 | 25 | 13 | 6 | 0 | 0 | 0 |
| 40 | 40 | 35 | 27 | 20 | 8 | 0 |
| 20 | 75 | 65 | 58 | 40 | 32 | 19 |
| 0 | 90 | 79 | 74 | 57 | 41 | 29 |

OUTLINE OF COLOR GAMUT COMPRESSION (LIGHTNESS RANGE CONVERSION)
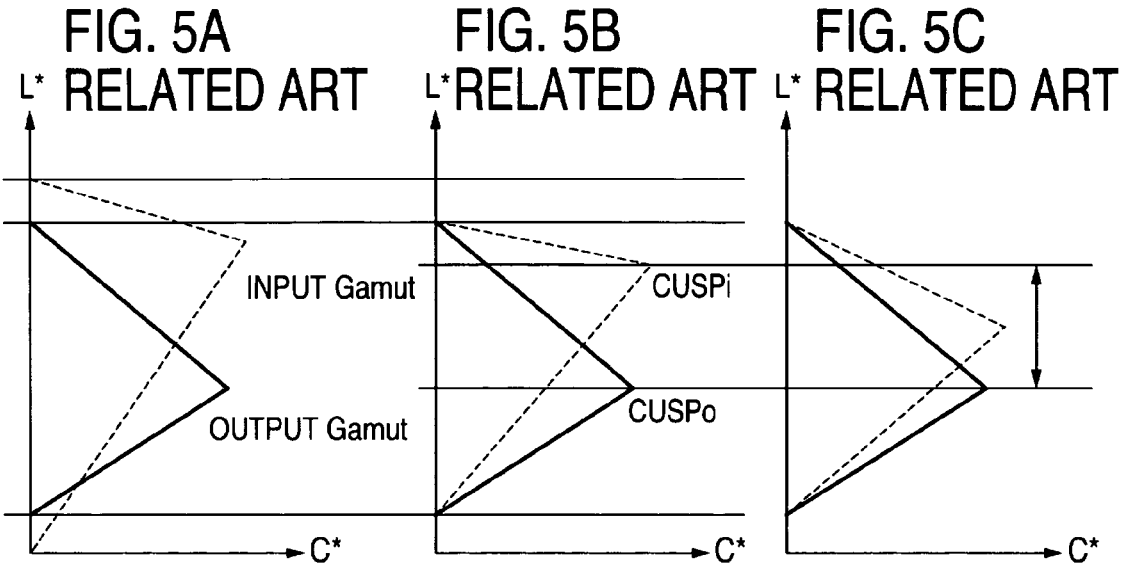
FIG. 5A RELATED ART
FIG. 5B RELATED ART
FIG. 5C RELATED ART
FIG. 5D RELATED ART
OUTLINE OF COLOR GAMUT COMPRESSION (LIGHTNESS/CHROMA COMPRESSION)
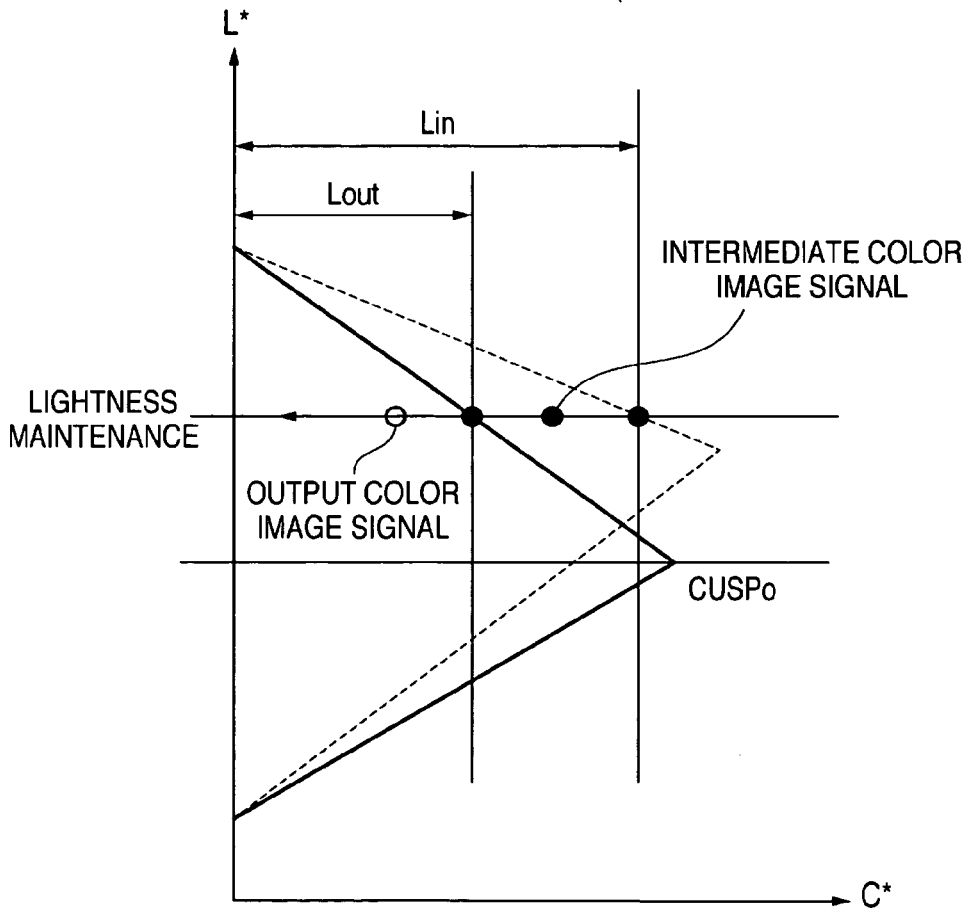

EXAMPLE OF BLACK THIN LINE EVALUATION VALUE

EXAMPLE OF COLOR THIN LINE EVALUATION VALUE

IMAGE PROCESSING METHOD, IMAGE PROCESSING APPARATUS AND STORAGE MEDIUM STORING A PROGRAM

BACKGROUND OF THE INVENTION (1) Field of the Invention

The present invention relates to an image processing method, an image processing apparatus and a storage medium storing a program, and more particularly, to a color signal generation processing technique suitably used for an image processing function of an image forming apparatus such as a copying machine, a printer, a FAX or a compound machine having these functions in a compound manner.

(2) Description of the Related Art

In an image forming apparatus, such as a color copying machine, for forming an image on a specified recording medium, there is adopted a mechanism which creates, based on an input image signal expressing a processing object image having gradation, an output color signal corresponding to a color material used in an output device.

For example, when a color image is color-printed by an electrophotographic system or the like, in general, four-color printing with yellow (Y), magenta (M), cyan (C) and black (K) is often used. On the other hand, a general color signal is a color signal in a three-dimensional color space, such as a Lab, Luv color space independent of a device, or an RGB color space used for a monitor signal or the like. Accordingly, in the case where a color image is color-printed, it is necessary to convert the color signal in the three-dimensional color space into a four-dimensional color space.

For example, a mechanism is known in which, when an output color signal is generated, a drawing direction of a line segment is judged, a screen with an angle different from the drawing direction of the line segment is applied to a color whose disappearance should be avoided, and the screens are switched according to the drawing direction of a character or a line, so that the disappearance of a thin line is prevented.

Besides, another mechanism is also known that the amount of black is determined so that coverage limitation is satisfied and color gamut becomes maximum. By doing so, the color gamut which can be reproduced by four colors and satisfies the coverage limitation is effectively used, unnecessary color gamut compression is prevented, and conversion to a four-color color signal containing black to reproduce an objective color signal can be performed at high precision. In addition, color reproducibility can be improved by using the converted four-color color signal, or by using a multidimensional conversion table obtained by associating the converted four-color color signal with the objective color signal or conversion coefficients.

However, in the mechanism described above, although consideration is given to the disappearance of the thin line, in other words, the reproducibility of the thin line, two kinds of image attribute signals, that is, the character/line and the drawing direction are needed, and the data amount is increased. Besides, there is a disadvantage that there occurs a stepped part due to a difference in screen type.

Besides, in another mechanism described above, although the amount of black is determined so that the coverage limitation is satisfied and the color gamut becomes maximum, consideration is not given to the thin line reproducibility. Thus, although the color gamut is widened, the thin line can disappear. That is, the color signal to satisfy both the thin line reproducibility and the color reproducibility can not be generated.

SUMMARY OF THE INVENTION

The present invention has been made in view of the above circumstances and provides an image processing method for generating a suitable color signal in which the problem of thin line disappearance can be prevented without causing the problem of a stepped part due to the difference in data amount and screen type.

According to an aspect of the invention, an image processing method for generating an output color signal to reproduce an output image corresponding to an input image, includes evaluating reproducibility of a line segment in the output image, and generating the output color signal based on the evaluation.

According to another aspect of the invention, an image processing apparatus for generating an output color signal to generate an output image corresponding to an input image by processing an input color signal that represents the input image includes a signal processing part that evaluates reproducibility of a line segment in the output image and generates the output color signal.

According to yet another aspect of the invention, a storage medium readable by a computer stores a program of instructions executable by the computer. The program causes the computer to perform a function including evaluating reproducibility of the line segment in the output image constituting the input image, and generating the output color signal based on the evaluation.

BRIEF DESCRIPTION OF THE DRAWINGS

Embodiments of the invention will be described in detail based on the following figures, wherein:

FIGS. 2A and 2B are tables showing examples of a relation among lightness, chroma and a black amount coefficient determined by a black amount coefficient determination part;

FIGS. 5A to 5D are views for explaining a color conversion process;

DETAILED DESCRIPTION OF THE INVENTION

Hereinafter, an embodiment of the invention will be described in detail with reference to the drawings.

<Whole Structure>

Figure 1:
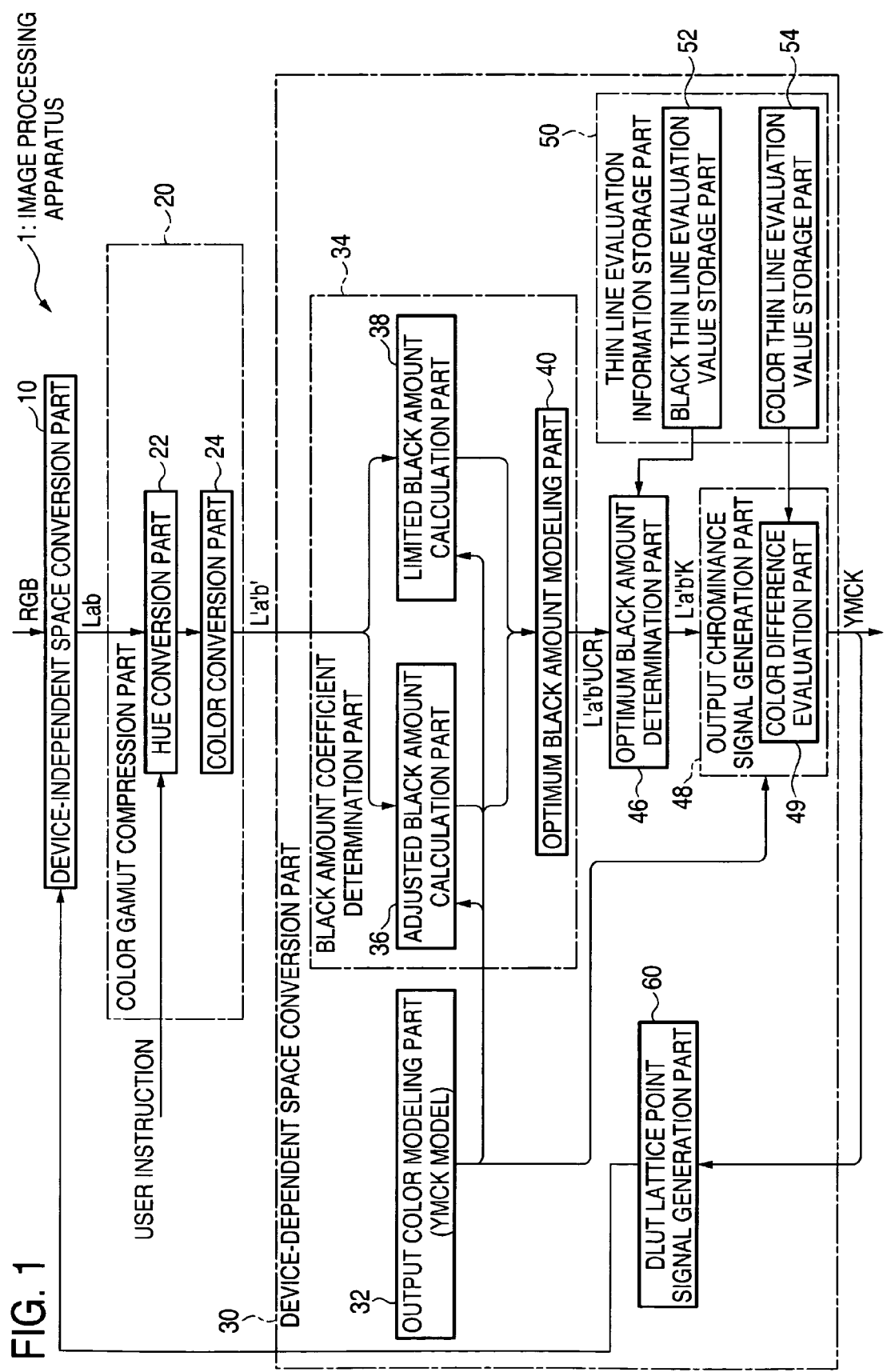
FIG. 1 is a block diagram showing the outline of the whole structure of an embodiment of an image processing apparatus of the invention.

FIG. 1 is a block diagram showing the outline of the whole structure of an embodiment of an image processing apparatus of the invention. Incidentally, an image processing apparatus 1 of this embodiment can be provided as a single apparatus, or it can be constructed by being incorporated in an output apparatus such as, a printer or a printing apparatus.

The image processing apparatus 1 of this embodiment has a feature that when an output color signal corresponding to a color material used in an output device is generated, the mechanism described above is used, and the amount of black and the amount of remaining color material are adjusted in view of the reproducibility of a thin line.

By doing so, while the thin line reproducibility is maintained, the effect of the mechanism described above, that is, the effect of maintaining the good color reproduction and gradation property of image data can be obtained. The optimum amount of black is determined in view of the coverage limitation while the control of the amount of black according to an object remains possible, so that the color gamut which can be reproduced by four colors and satisfies the coverage limitation is effectively used, unnecessary color gamut compression is prevented, and conversion into a four-color color signal containing black to realize an objective color signal can be performed at high precision. In addition, consideration is given to the reproducibility of a thin line, so that even when the color gamut is widened, the thin line can be made not to disappear. Hereinafter, a specific description will be made.

As shown in the drawing, the image processing apparatus 1 of this embodiment includes a device-independent space conversion part 10 which performs, when a color space of an input image signal is different from a color space used at a latter stage, a color space conversion processing into the color space used in the latter stage (especially to the device-independent color space independent of a device), and a color gamut compression part 20 to convert a color reproduction gamut of the input image signal which has been converted into the device-independent color space independent of the device.

Besides, the image processing apparatus 1 includes a device-dependent space conversion part 30 as an example of an output color space conversion part to perform, when a color space of an output color image signal is different from a color space used at an output device side to receive the output color image signal, a color space conversion processing into the color space (for example, a YMCK color space) used at the output device side, and a DLUT lattice point signal generation part 60 to generate RGB values corresponding to lattice points for generating a multidimensional conversion table DLUT.

The color gamut compression part 20 includes a hue conversion part 22 to perform a processing of shifting a hue according to the color of the input image signal while the lightness and chroma are held, and a color conversion part 24 to convert the input image signal after the hue is shifted by the hue conversion part 22 into a color within a color reproduction gamut at the output side while the hue after the shift is held and to output the output image signal.

The processings of the hue conversion part 22 and the color conversion part 24 use a color space independent of a device, for example, a color space of CIE-L'a'b' (hereinafter, "'" will be omitted) or the like. For example, when the input image signal is a color image signal in an RGB color space for display on a CRT (Cathode-Ray Tube) or an LCD (Liquid Crystal Device), the device-independent space conversion part 10 performs the color space conversion from the RGB color space into the CIE-Lab color space. Of course, in the case where the input image signal is a signal in a color space independent of a device used in the inside, the processing in the device-independent space conversion part 10 is unnecessary, and the structure may be made such that the device-independent space conversion part 10 is not provided.

To shift the hue in the hue conversion part 22 means changing the color itself. However, in subsequent processing, there is a case where when the lightness and chroma are changed while the hue is kept, they need to be largely changed, however, when the hue is slightly shifted, the change amount of the lightness and chroma is small, and the color conversion appearing to be more natural can be performed. In such a case, the processing to slightly shift the hue is performed in the hue conversion part 22. The shift amount of the hue varies according to the color of the input image signal, and it can be previously determined based on, for example, a visual experiment. The shift amount by which the outputted image appears to be more natural may be set.

When performing the conversion into the color within the color reproduction gamut at the output side and outputting the output image signal, the color conversion part 24 once converts the range of the color (input side color reproduction gamut), which the input image signal can take after the hue is shifted by the hue conversion part 22, into an intermediate color reproduction gamut. In accordance with this conversion, the input image signal after the hue is shifted is converted into an intermediate image signal within the intermediate color reproduction gamut. Further, the intermediate image signal is converted into the color within the color reproduction gamut at the output side, and the output image signal is outputted.

As the intermediate color reproduction gamut, an adjustment in the lightness direction is applied to the input side color reproduction gamut so that the maximum value and the minimum value of the input side color reproduction gamut in the lightness direction become coincident with the maximum value and the minimum value of the lightness of the output side color reproduction gamut. Further, the color reproduction gamut is adjusted so that the maximum chroma is obtained at lightness obtained by a specified function based on a difference between the lightness of a point having the maximum chroma in the color reproduction gamut after the adjustment in the lightness direction is performed and the lightness of a point having the maximum chroma in the output side color reproduction gamut. The color reproduction gamut obtained in this way can be set as the intermediate color reproduction gamut.

Besides, when the intermediate image signal is converted into the color within the output side color reproduction gamut, since the hue has already been shifted by the hue conversion part 22, here, the shift of only the chroma, or the lightness and the chroma is performed. For the shift of the lightness and the chroma, a conventionally performed method can be used. Especially in this embodiment, an achromatic color having the lightness of the point having the maximum chroma within the output side color reproduction gamut is made the target point, and in the case where the lightness of the intermediate image signal is higher than the lightness of the target point, the lightness is kept and the chroma is conversion-processed according to the output side color reproduction gamut. By this, with respect to a bright color, the conversion processing can be performed without lowering the lightness very much. Besides, in the case where the lightness of the intermediate image signal is lower than the lightness of the target point, the lightness and chroma are conversion-processed according to the output side color reproduction gamut in the direction of the straight line connecting the color of the intermediate image signal and the target point. By this, with respect to a dark color, conversion into a balanced color can be performed.

The device-dependent space conversion part 30 performs the color space conversion processing into the color space used in the output device. With respect to a line segment constituting the input image, the device-dependent space conversion part 30 has the function of a signal processing part to add an evaluation concerning the reproducibility of the line segment in the output image and to generate the output color signal.

Here, the device-dependent space conversion part 30 calculates a combination of output color signals in which a color difference becomes minimum when the device-independent color signal is converted into the device-dependent color signal. Besides, as a feature portion of this embodiment, in this process, the evaluation concerning the thin line reproducibility is added, and the device-dependent color signal (output color signal) is generated.

For example, in the case where the output device is a printer or the like, the output device often receives a color image signal of a YMC color space or a YMCK color space. In such a case, the device-dependent space conversion part 30 performs the color space conversion processing from the color space independent of output device, for example, the color space of CIE-Lab or the like into the YMC color space or the YMCK color space. Of course, the output may be made without converting the color space independent of the output device, and in this case, the color conversion processing itself in the device-dependent space conversion part 30 is unnecessary.

Here, as the feature portion of this embodiment, the device-dependent space conversion part 30 first predicts an optimum amount of black to a color signal in the objective color space (Lab color space) based on a model formed of plural pairs of typical color signals in the objective color space and optimum amounts of black to the typical color signals. As the typical color signals used at this time, together with plural color signals belonging to a partial color space as a color gamut which can be displayed by, at least, three colors, plural color signals are used which can be expressed by four colors containing black and belong to a curved surface satisfying the coverage (color reproduction gamut) limitation.

In addition, the device-dependent space conversion part 30 of the embodiment is significantly characterized by adopting a mechanism to compensate the reproducibility of a thin line (hereinafter referred to as a black thin line) expressed by black as one of color materials, and a thin line (hereinafter referred to as a color thin line) expressed by Y, M or C as the remaining color material.

Incidentally, the color thin line includes a primary color thin line expressed by one color of Y, M and C, a secondary color thin line expressed by a combination of two colors of Y, M and C (K may be contained according to circumstances), and a tertiary color thin line (achromatic thin color) expressed by the combination of all of Y, M and C.

Specifically, the device-dependent space conversion part 30 first includes, as functional parts to calculate the amount of black and the amount of remaining color material in view of the optimum reproducibility of the thin line, an output color modeling part 32 to perform modeling of an output device in the objective output color space (for example, YMCK) by an arbitrary method, a black amount coefficient determination part 34 to obtain an adequate black amount coefficient, and an optimum black amount determination part 46 to specify an optimum amount of black.

Besides, the device-dependent space conversion part 30 includes an output color signal generation part 48 which uses Lab inputted to the optimum black amount determination part 46 and the optimum amount of black calculated by the optimum black amount determination part 46 to predict the output color signal (here, YMC) based on the model constructed by the output color modeling part 32, and calculates the output color signal (here, YMCK) to reproduce the inputted Lab, and a nonvolatile (the meaning of the term "nonvolatile" will be described later) thin line evaluation information storage part 50 to store table information to express the evaluation concerning the reproducibility of a line segment.

The output color modeling part 32 models a device-dependent signal from a device-independent signal. For example, when modeling of the output device in the objective color space is performed by an arbitrary method, as a method of the modeling, for example, a method of weighted linear regression, neural net, weighted average or the like is used. Of course, as long as a model capable of estimating remaining three values from four values among Y, M, C, K and Lab can be constructed, any method may be used.

In this embodiment, for example, the method of the weighted linear regression is used. In the output color modeling part 32, an adequate combination of Y, M, C and K is actually printed to create a color patch, the color of the color patch is actually measured to obtain the values of Lab, and plural pairs of the values of Y, M, C and K and the values of Lab are generated.

The black amount coefficient determination part 34 includes an adjusted black amount calculation part 36 to calculate an adjusted amount of black, a limited black amount calculation part 38 to calculate a limited amount of black, and an optimum black amount modeling part 40 to perform modeling between Lab and the optimum amount of black.

The adjusted black amount calculation part 36 selects plural Lab values in the color gamut which can be expressed by three colors except black, calculates an achromatic amount of black from the Lab values, and calculates the adjusted amount of black by multiplying the achromatic amount of black by the black control parameter previously set according to the Lab. Here, the achromatic amount of black is the amount of black in the case where an unnecessary color is made 0. Specifically, it is the amount of black in a four-color color signal to reproduce an objective color signal under the condition of Y=0%, or M=0%, or C=0%.

The limited black amount calculation part 38 selects plural Lab values on the contour of the color gamut which can be expressed by four colors containing black and satisfies coverage limitation, and calculates plural pairs of the selected Lab values and the maximum amounts of black corresponding thereto.

The optimum black amount modeling part 40 performs modeling between the Lab and the optimum amount of black from the plural pairs of Lab values calculated by the adjusted black amount calculation part 36 and the corresponding adjusted amounts of black, and plural pairs of Lab values calculated by the limited black amount calculation part 38 and the corresponding limited amounts of black. As a method of modeling, for example, weighted linear regression, neural net, weighted average or the like may be used. Of course, as long as a model capable of estimating the optimum amount of black from L, a and b can be constructed, any method may be used. Besides, various interpolation methods such as a linear interpolation may be used without constructing the estimation model.

In this embodiment, for example, a method of the weighted linear regression is used, and the optimum black amount modeling part 40 simply adds the plural pairs of Lab values calculated by the adjusted black amount calculation part 36 and the corresponding adjusted amounts of black, and the plural pairs of Lab values calculated by the limited black amount calculation part 38 and the corresponding limited amounts of black, and generates plural pairs of Lab values and the corresponding optimum amounts of black.

For example, FIGS. 2A and 2B are tables showing examples of the relation among the lightness L, the chroma C and the black amount coefficient determined in accordance with the procedure by the black amount coefficient determination part 34. Here, FIG. 2A shows an example in the case where the processing object is a graphic, and FIG. 2B shows an example in the case where the processing object is an image.

As shown in FIGS. 2A and 2B, with respect to the black amount coefficient, a UCR rate may be determined from the Lab signal by the lightness L and the chroma C, or the UCR rate by the relation of the lightness and the chroma may be defined and determined for each hue.

The optimum black amount determination part 46 predicts the optimum amount of black of Lab inputted from the color gamut compression part 20, based on the model of the optimum black amount modeling part 40 between the Lab and the optimum amount of black.

When this prediction model of the optimum black amount modeling part 40 is expressed by an expression, it can be expressed by the following expression (1).

$$K = \text{acro}\_K (\text{or Max}K) \times UCR\text{rate} \tag{1}$$

Here, the maximum amount Max_K of black is such an amount of black that from an arbitrary color signal in an objective color space, when a four-color color signal containing black to reproduce the color signal is generated, the coverage limitation is satisfied and the color gamut becomes maximum. The achromatic amount acro_K of black is an example of the optimum amount of black corresponding to plural typical color signals belonging to a partial color space as a color gamut which can be expressed by at least three colors.

The output color signal generation part 48 calculates YMCK to be reproduced.

In the example shown in FIG. 1, the example is shown in which the multidimensional conversion table (DLUT) is generated. In this example, the generated DLUT is a three-dimensional table in which each axis of the RGB color space is divided, and the YMCK signal is made to correspond to RGB of the lattice point. When an arbitrary color signal is inputted, the YMCK signal corresponding to the inputted color signal is obtained by, for example, interpolation from the lattice point corresponding to the inputted color signal or a near lattice point and is outputted.

In order to generate such DLUT, the DLUT lattice point signal generation part 60 generates RGB corresponding to the lattice point and inputs it to the device-independent space conversion part 10. For example, each of R, G and B is made 0 to 255, RGB corresponding to 17^3 ("^" denotes a power)= 4913 lattice points obtained by dividing each axis by 16 are generated one by one, and are inputted to the device-independent space conversion part 10. Then, the amount of black determined by the optimum black amount determination part 46 from the color gamut compression part 20 through the black amount coefficient determination part 34, and YMC predicted by the output color signal generation part 48 using the amount of black are made to correspond to the inputted RGB, and they are made the data of the lattice point.

In this way, the DLUT to generate YMCK from Lab can be created, and by using this DLUT, image data by RGB or its partial image can be converted into image data by YMCK or its partial image.

Up to this point, the structure from the output color modeling part 32 to the output color signal generation part 48, and the outline of the series of processings have been described, and the structure when the DLUT is generated has also been described. Incidentally, when the output device such as a color printer and the previously set black control parameter are determined, the operation from the output color modeling part 32 to the optimum black amount modeling part 40 can be previously performed. In this case, the optimum black amount determination part 46 and the output color signal generation part 48 have only to be operated.

Besides, since the coverage limitation is generally determined by the output device, at the time point when the output device is determined, the output color modeling part 32, the adjusted black amount calculation part 36 on the assumption that the black control parameter is 100%, the limitation black amount calculation part 38, and the optimum black amount modeling part 40 are performed, and at the time point when the setting of the black control parameter is determined, the black control parameter can be applied to only the optimum amount of black corresponding to the adjusted amount of black among plural pairs of Lab and the optimum amount of black generated in the optimum black amount modeling part 40. By doing so, while the black control parameter is effectively changed by trial and error, the optimum amount of black corresponding to the object can be designed.

Further, in the above description, although the example in which the YMCK signal corresponding to RGB of the lattice point of the DLUT is acquired has been described, the invention is not limited to this. For example, typical RGB is inputted to the device-independent space conversion part 10, the color gamut compression part 20, the black amount coefficient determination part 34, and the optimum black amount determination part 46, and the coefficient for color conversion of the color input image may be generated from the correspondence relation to the YMCK signal acquired from the output color signal generation part 48. The color conversion from an arbitrary RGB to the YMCK signal can be performed by using the generated coefficient.

Here, the optimum black amount determination part 46 and the output color signal generation part 48 of this embodiment refer to the evaluation values stored in the thin evaluation information storage part 50, and generate the output color signal in view of the optimum reproducibility of the thin line. Especially, the output color signal generation part 48 is characterized by including a color difference evaluation part 49 to generate the output color signal in view of the optimum reproducibility of the color thin line.

Besides, in this embodiment, the thin line evaluation information storage part 50 specifically includes a black thin line evaluation value storage part 52 and a color thin line evaluation value storage part 54 in order to keep the good color reproduction and gradation of image data while the thin line reproducibility of the black thin line and the thin line reproducibility of the color thin line are kept.

The previously evaluated black thin line evaluation result is stored in the black thin line evaluation value storage part 52. At this time, the black thin line evaluation value storage part 52 stores table information of the correspondence relation of the output signal value to the input signal value of the objective black thin line reproduction based on the output result of the black thin line evaluation object including a half tone. As stated above, the correspondence table is created based on the thin line reproduction characteristic of the black thin line obtained from the actual output result, so that the desired thin line reproducibility of the black thin line can be realized.

Besides, the color thin line evaluation storage part 54 stores the previously evaluated color thin line evaluation result. At this time, the color thin line evaluation value storage part 54 stores table information of color thin line evaluation values to one input signal value of the objective color thin line reproduction or the combination of plural input signal values based on the output result of the color thin line evaluation object including the half tone. As stated above, the correspondence table is created based on the thin line reproduction characteristic of the color thin line obtained from the actual output result, so that the good color reproduction and gradation of the image data can be kept while the desired thin line reproducibility of the color thin line is realized.

Based on the modeling result of the optimum black amount modeling part 40 and the evaluation value concerning the black thin line stored in the black thin line evaluation value storage part 52, the optimum black amount determination part 46 determines the amount of black in view of the optimum reproducibility of the black thin line, that is, generates the black signal (K) as one of the output color signals. When this generation model is expressed by an expression, it can be expressed by the following expression (2).

$$K_{cad} = f(\text{acro\_}K (\text{or Max}K)) \times UCR\text{rate} \quad (2)$$

As is understood from the correspondence with the expression (1), the amount Kcad of black obtained in this embodiment is indicated by the product of the function f relating to the achromatic amount acro_K of black or the maximum amount Max_K of black and the UCR rate. Specifically, the output data K(Kcad) is determined so that the amount of black determined by the expression (1) increases by an adequate amount optimized for each amount of black (see FIG. 8A described later). With respect to all amounts of black obtained by the expression (1), the amount of black is not simply increased by an equal amount.

Besides, based on the information from the optimum black amount determination part 46, the color thin line evaluation storage part 54, and the output color modeling part 32, the output color signal generation part 48 evaluates the device-dependent signal by which the color difference becomes minimum, and determines the amount of remaining color material in view of the optimum reproducibility of the color thin line, that is, generates the respective color signals of Y, M and C as the remainder of the output color signals optimized for the reproduction of the color thin line.

Here, the color difference evaluation part 49 makes an evaluation based on the color difference obtained by subtracting the thin line evaluation value obtained from the color thin line evaluation value storage part 54 from the color difference between the device-independent signal obtained from the device-dependent signal by the output color modeling part 32 and the device-independent signal obtained from the optimum black amount determination part 46. The output color signal generation part 48 refers to the evaluation result of the color difference evaluation part 49 and specifies the final output color signals Y, M, C and K.

When this generation model is expressed by an expression, it can be expressed by expression (3-1), (3-2) and expression (4). Here, the respective expressions in the expressions (3-1) and (3-2) indicate a general YMC amount determination method, and the expression (4) indicates the YMC amount determination method of this embodiment in view of the color thin line.

$$\Delta E_{76} = \sqrt{(L' - L_{out})^2 + (a' - a_{out})^2 + (b' - b_{out})^2} \quad (3\text{-}1)$$

$$c' = \sqrt{(a')^2 + (b)^2}$$

$$c_{out} = \sqrt{(a_{out})^2 + (b_{out})^2}$$

$$cc = \sqrt{c' \times c_{out}}$$

$$h' = a\tan2(b'/a')$$

$$h_{out} = a\tan2(b_{out}/a_{out})$$

$$\Delta L = L' - L_{out}$$

$$\Delta C = c' - c_{out}$$

$$\Delta H = \sqrt{2 \times c' \times c_{out} \times (1 - \cos(h' - h_{out}))}$$

or $$\Delta E_{94} = \sqrt{\Delta L^2 + \left(\frac{\Delta C}{1 + 0.045 \times cc}\right) + \left(\frac{\Delta H}{1 + 0.015 \times cc}\right)} \quad (3\text{-}2)$$

$$\Delta E_{cad} = \Delta E_{76}(\text{or } \Delta E_{94}) - f(Y, M, C) \quad (4)$$

Expression (3-1) and expression (3-2) are color difference expressions for correcting the lightness, chroma and hue (LCh) of the Lab color system (CIE LAB) to match the visual feeling of the Munsell color system, the expression (3-1) is proposed on 1976 by the CIE technical committee, and the expression (3-2) is proposed on 1994 by the CIE technical committee.

As is understood from the correspondence to the expression (3-1) and (3-2), the YMC value $\Delta E_{cad}$ corresponding to the amount of color material obtained by this embodiment is indicated by the difference between the function f relating to Y, M and C and $\Delta E76$ or $\Delta E94$, and as compared with the general YMC amount determination method indicated by the expression (3-1) and (3-2), the evaluation value of the color thin line reproduction is added.

Specifically, as is understood from the expression (4) the output data Lab ($\Delta$Ecad) is determined so that the color difference $\Delta E76$ or $\Delta E94$ between the Lab of the input image data and the Lab of the output image data become small. The function f(Y, M, C) of the second term of the right side functions as the correction amount to $\Delta E76$ or $\Delta E94$.

In general, in order to obtain the good color reproduction, the combination of YMCK by which the color difference between the data in the device-independent space (Lab) and the Lab value calculated by the output color modeling part 32 from the combination of YMCK becomes minimum is changed to the YMCK value of the image data. At this time, in order to give slightly high priority to the YMCK of the combination in which the thin line reproducibility becomes good, it is replaced by a smaller value than the Lab value calculated from the output color modeling part 32, so that the data of the combination of the YMCK in which the reproducibility of the color thin line becomes good is made easy to be selected. By this, while the thin line reproducibility of the color thin line is realized, the good color reproduction and gradation of the image data can be kept.

That is, as in this embodiment, the amount of black is determined so that the color gamut is widely reproduced to the maximum, and at the time of determination of the output density of each color, when the output density of each color is determined in view of the thin line reproducibility, that is, when the output color signal is generated in view of the reproducibility of the thin line, it becomes possible to adequately reproduce the thin line which can not be conventionally reproduced since it becomes discontinuous or becomes serrated.

<Outline of Processing of Color Gamut Compression Part>

Figure 3:
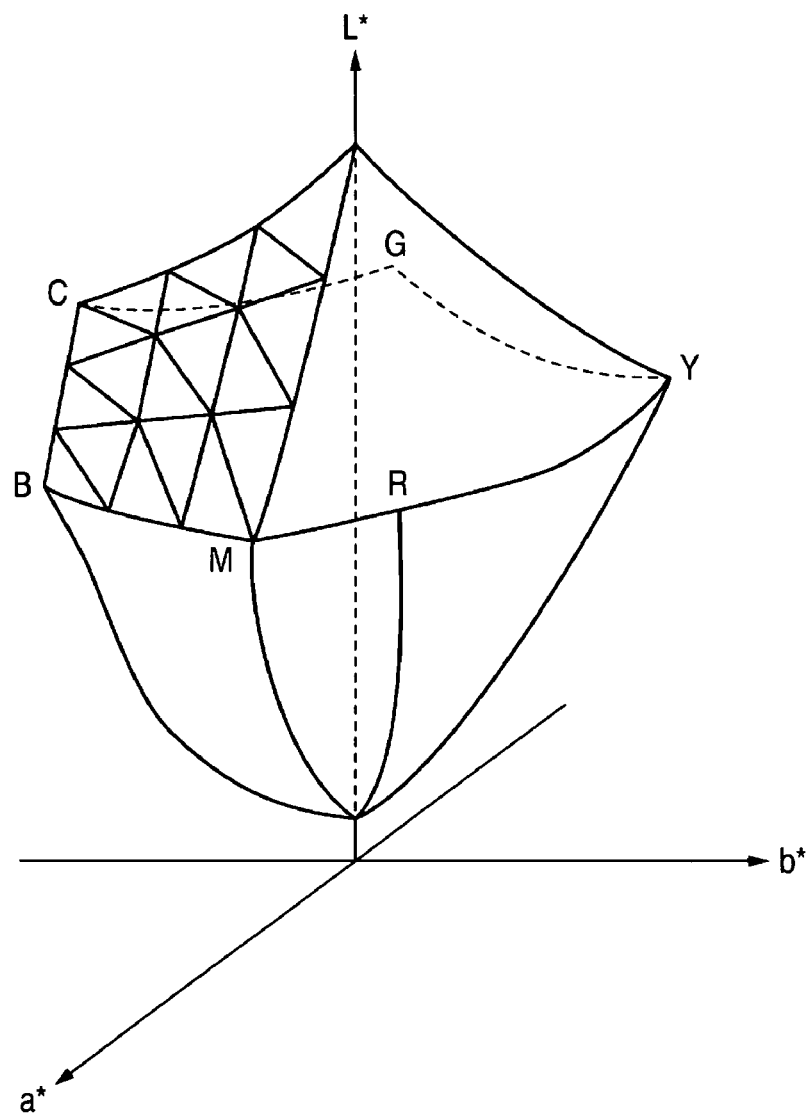
FIG. 3 is a view showing a relation between an input color space and an output color space.

FIGS. 3 to 5D are views for explaining the processing of the color gamut compression part 20. Here, FIG. 3 is a view showing the relation between the input color space (Lab color space in this embodiment) and the output color space (YMCK color space in this embodiment). FIGS. 4A and 4B are conceptual views for explaining a method of converting the hue in the color reproduction area by the hue conversion part 22. FIGS. 5A to 5D are views for explaining a color conversion process by the color conversion part 24, and are conceptual views for explaining the method of converting (especially compressing) the lightness range and chroma range in the color reproduction gamut.

In the color gamut compression part 20, while the lightness and chroma are held, the hue is shifted by the hue conversion part 22 according to the color of the input image signal. At this time, the input side color reproduction gamut and the output side color reproduction gamut are previously obtained. At this time, it is appropriate that they are obtained in a color space independent of a device, for example, in the CIE-Lab color space. Incidentally, in the following description, it is assumed that the internal processing is performed in the CIE-Lab color space.

Here, the color reproduction gamut is not generally uniform, and for example, in the CIE-Lab color space, as shown in FIG. 3, it has a complicated three-dimensional shape. The inside of a solid shown in FIG. 3 is an area where color reproduction is possible, and the outside thereof is an area where a color can not be reproduced. Here, information of a plane (contour plane) indicating the boundary between the area where the color can be reproduced and the area where the color can not be reproduced is obtained.

Next, the hue conversion part 22 determines the shift amount by which the hue of the input image signal is shifted. In case the shift amount of the hue is previously determined by a visual experiment or the like, the determined value is used.

Figure 4A:
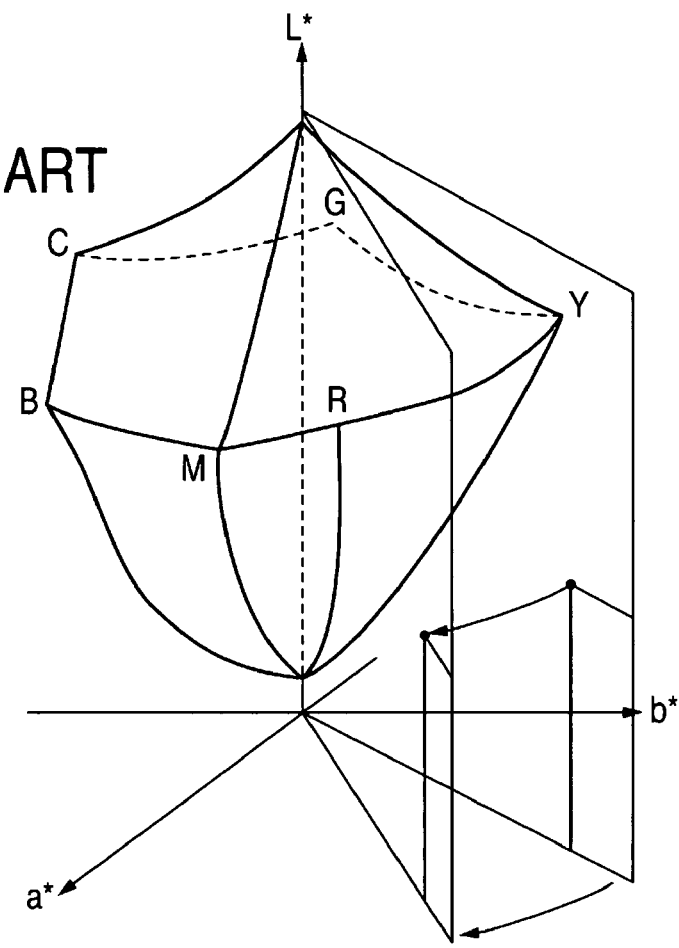
FIGS. 4A and 4B are conceptual views for explaining a method of converting a hue.
Figure 4B:
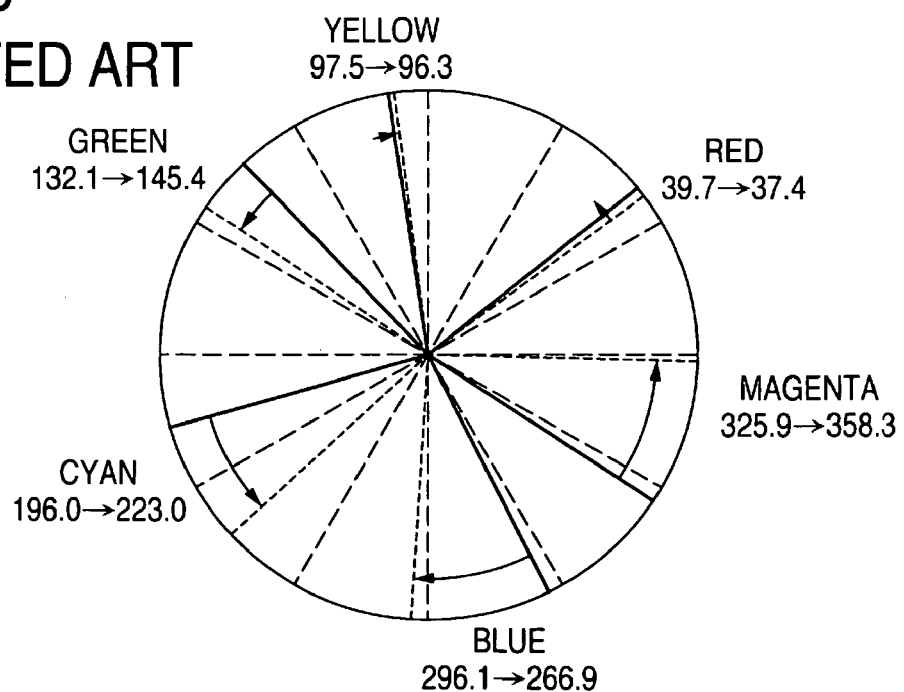

For example, FIGS. 4A and 4B show an example of the shift method of the hue which is set in the hue conversion part 22. Although the amount of the hue shift (for example, the shift from "A" to "B" in FIG. 4A) can be determined for each color, here, as an example, the amounts are determined for only typical colors (specific signal values), and a color between them can be obtained by interpolation or the like. As specific signal values, pure colors of red, yellow, green, cyan, blue and magenta can be used. For example, in the case where the input image signal is in the RGB color space, these pure colors are given as saturation color signals in the respective colors of R, G and B.

The hue conversion part 22 determines the optimum hue shift amount to these specific signal values by, for example, a visual experiment or the like. FIG. 4B shows an example of hue before the shift and after the shift. For example, with respect to yellow and red, since the input side color reproduction gamut and the output side color reproduction gamut are not much different from each other, the hue shift amount is small. Green is shifted to a color slightly close to blue. Besides, the hue is shifted so that cyan approaches blue, blue approaches cyan, and magenta approaches red. Incidentally, the shift amount of the hue is not limited to this example, but can be arbitrarily determined. Besides, the specific signal values are not limited to the foregoing six colors, and the number of colors is not limited to six.

Next, an input image signal is inputted to the apparatus. In the case where the input image signal is the signal of a color space other than a color space independent of a device used in the inside, color space conversion is performed into the signal of the color space independent of the device by the device-independent space conversion part 10. For example, when the input image signal is the signal in the RGB color space, the device-independent space conversion part 10 performs the color space conversion from the RGB color space to the CIE-Lab color space.

Next, the hue conversion part 22 shifts the hue of the input image signal converted into the CIE-Lab color space by the shift amount previously determined according to the color of the input image signal. As shown in FIGS. 4A and 4B, with respect to the specific signal value, the shift amount of the hue is previously determined. Thus, with respect to the hue of the specific signal value, the hue has only to be shifted by the determined shift amount. Besides, with respect to the input image signal of the hue other than the specific signal value, the shift amount of the hue can be obtained by, for example, linear interpolation from the shift amount of the hue of the specific signal value. Of course, a color other than the specific signal value may be obtained by a method other than the linear interpolation.

In general, the color reproduction gamuts at the input side and at the output side are significantly different from each other, and a high chroma color can not be reproduced at the output side. When the input image signal is converted to the color in the output side color reproduction gamut without changing the hue, a large color change can occur, for example, the chroma extremely drops or the lightness decreases. However, when the hue is shifted, the output side color reproduction gamut of the hue at the shift destination can be made close to the shape of the input side color reproduction gamut. Thus, the conversion amount in the next color conversion part 24 becomes small, and the large change in the chroma and lightness can be avoided.

Incidentally, according to circumstances, for example, magenta becomes slightly reddish, however, as compared with the case where the chroma and lightness are changed without changing the hue, the color close to magenta can be represented to the eye, and the visual change of color can be suppressed.

Next, the color conversion part 24 converts the input image signal, after the hue is shifted by the hue conversion part 22, into the color within the color reproduction gamut at the output side while the hue after the shift is held and outputs the output image signal. Here, it is once converted into a color within an intermediate color reproduction gamut, and then, is converted to a color within the output side color reproduction gamut. Besides, at the time of conversion from the intermediate color reproduction gamut to the output side color reproduction gamut, the conversion method is changed according to the lightness of the input image signal. By this, it can be converted into the best color within the output side color reproduction gamut.

FIGS. 5A to 5C are explanatory views of a specific example of a setting process of the intermediate color reproduction gamut in the color conversion part 24, and show the outline of the color gamut compression (lightness range conversion) In the drawing, a broken line indicates the input side color reproduction gamut, and a solid line indicates the output side color reproduction gamut after the hue shift. Here, the section in the hue after the hue shift is shown, and in the coordinate system in this section, the vertical axis is an L axis indicating the lightness, and the horizontal axis is a C axis indicating the chroma.

It is assumed that the input side and output side color reproduction gamuts as shown in FIG. 5A are obtained. First, as shown in FIG. 5B, the color conversion part 24 causes the lightness range of the input side color reproduction gamut, that is, the range from the maximum value of the lightness to the minimum value of the lightness to be coincident with the lightness range of the output side color reproduction gamut. Further, a point (CUSPi) is adjusted by a specified function within the range of a difference between the lightness of a point (cusp CUSPi) having the maximum chroma in the input side color reproduction gamut after the adjustment of lightness range is performed and the lightness of a point (CUSPo) having the maximum chroma in the output side color reproduction gamut, and the intermediate color reproduction gamut is set. By this, the intermediate color reproduction gamut as indicated by a broken line in FIG. 5C is obtained. The input image signal after the hue is shifted is subjected to the color conversion by the same procedure as the conversion process from the input side color reproduction gamut to the intermediate color reproduction gamut, and becomes an intermediate image signal.

FIG. 5D is an explanatory view of an example of the color conversion from the intermediate color reproduction gamut to the output side color reproduction gamut, and shows the outline of the color gamut compression (lightness/chroma compression) The color conversion part 24 first judges whether the lightness of the intermediate image signal is higher or lower than the lightness of the point (CUSPo) having the maximum chroma in the output side color reproduction gamut. In the case where the lightness of the intermediate image signal is higher than the lightness of the point (CUSPo), as shown in FIG. 5D, the conversion processing is performed only on the chroma, while the lightness is held, and the intermediate image signal is converted into the output image signal within the output side color reproduction gamut. By storing the lightness, the color conversion can be performed so that the high lightness color can be reproduced as bright as possible.

On the other hand, in the case where the lightness of the intermediate image signal is lower than the lightness of the point (CUSPo), although not shown, the color conversion part 24 causes an achromatic color (that is, on the L axis) having the same lightness as the lightness of, for example, the point (CUSPo) to be a target point, and performs the conversion processing of the lightness and chroma in the direction of a straight line connecting the color of the intermediate image signal and the target point. By such a conversion processing, a low lightness color can be converted into a similar color to the eye.

Incidentally, as the conversion method at the time when the intermediate image signal is converted into the output image signal within the output side color reproduction gamut, for example, a linear compression method or the like can be used. For example, a straight line parallel to the chroma axis, or a straight line connecting the color of the intermediate image signal and the target point is considered, a distance from the intersection point between this straight line and the contour of the intermediate color reproduction gamut to the L axis or the target point is made Lin, and a distance from the intersection point between the straight line and the contour of the output side color reproduction gamut to the L axis or the target point is made Lout. Besides, when a distance from a point indicating the intermediate image signal to the L axis or the target point is made L'in, and a distance from a point (indicated by a white circle ○) indicating the output image signal after the conversion to the L axis or the target point is made L'out, L'out can be obtained by L'out=(Lout/Lin)×L'in. The obtained L'out represents the chroma in the output color image signal after the color conversion. Of course, the conversion in the lightness direction may be performed by using a method other than the linear compression method.

In the color conversion part 24, the input image signal after the hue is shifted can be converted into the output image signal within the output side color reproduction gamut by an arbitrary method in addition to the above method. For example, the intermediate color reproduction gamut is not set, and it may be directly converted into the output image signal within the output side color reproduction gamut. At this time, a method of converting only chroma, or the lightness and chroma can be used. Besides, in the case where the input image signal is converted into the color within the output side color reproduction gamut by only the shift of the hue, the processing in the color conversion part 24 is unnecessary.

Next, the device-dependent space conversion part 30 converts the output image signal into the color space requested by the output side device. For example, when the output side device requests the color image signal of the YMCK color space, the color space conversion processing from the CIE-Lab color space to the YMCK color space has only to be performed. Of course, when the signal in the CIE-Lab color space used in the internal processing may be outputted without any change, the color space conversion processing itself is not needed. Here, the processing is ended.

Incidentally, in the foregoing description, although the description has been given on the assumption that with respect to the input image signal the processing is sequentially performed in the respective parts shown in FIG. 1, for example, the processings of the color conversion part 24 and the device-dependent space conversion part 30 can be collectively performed by using, for example, a multidimensional look-up table and interpolation, and also in this embodiment, the method using the multidimensional look-up table and the interpolation may be applied. Besides, the shift processing of the hue in the hue conversion part 22 is made to be included in the multidimensional look-up table, and the processing of the hue conversion part 22 and the device-dependent space conversion part 30 may be performed by the multidimensional look-up table and the interpolation. Of course, the processing of the device-independent space conversion part 10 can also be made to be included.

Besides, the hue conversion part 22 can be constructed such that some shift amounts are set according to the output image signal and the use object of the output image. As described also in FIGS. 4A and 4B, with respect to some specific signal values, the shift amount of the hue may be set for each use object based on the visual experiment or the like in the use object.

Before the input image signal is inputted, the user instructs which of the set pairs of hue shift amounts is to be used. The instruction method is arbitrary, and may be selected according to the use object. The hue conversion part 22 selects one of the set pairs of the hue shift amounts in accordance with the instruction of the user, and performs the shift processing of the hue on the input image signal in accordance with the selected hue shift amount. In this way, according to the output image signal or the use object of the outputted image, the optimum hue conversion is performed, and the output image signal in which the optimum color conversion is finally performed can be obtained.

Incidentally, in addition to the structure in which some pairs of the hue shift amounts are previously set according to the use object, for example, the structure may be made such that the user can directly change the hue shift amount. In this case, with respect to the hue shift amounts to be set, one pair or plural pairs may be set. In the case where plural pairs are set, after one of them is selected, a fine adjustment can be made by the instruction from the user.

As is apparent from the above description, according to the compression processing of the color reproduction gamut by the color gamut compression part 20 of the embodiment, in the process of converting the input image signal into the output image signal within the output side color reproduction gamut, after the shift of the hue is performed according to the color of the input image signal, conversion of only the chroma or the lightness and chroma is performed, and it is converted into the output image signal within the output side color reproduction gamut.

By this, even in the case where the color is significantly changed by the conversion of only the chroma or the lightness and chroma, the change amount of the lightness and chroma is made small by the shift of the hue, and conversion can be made to a similar color as a visual color. As stated above, since the input image signal can be converted into the desired color to the eye, the output image which can satisfy the user can be obtained in the output side device. In addition, when the structure is made such that the shift amount of the hue can be set for each use object, the optimized color conversion which can satisfy the user can be performed according to various user's objects.

<Outline of Procedure of Output Color Signal Generation Processing in which Importance is Attached to Thin Line Reproducibility>

Figure 6:
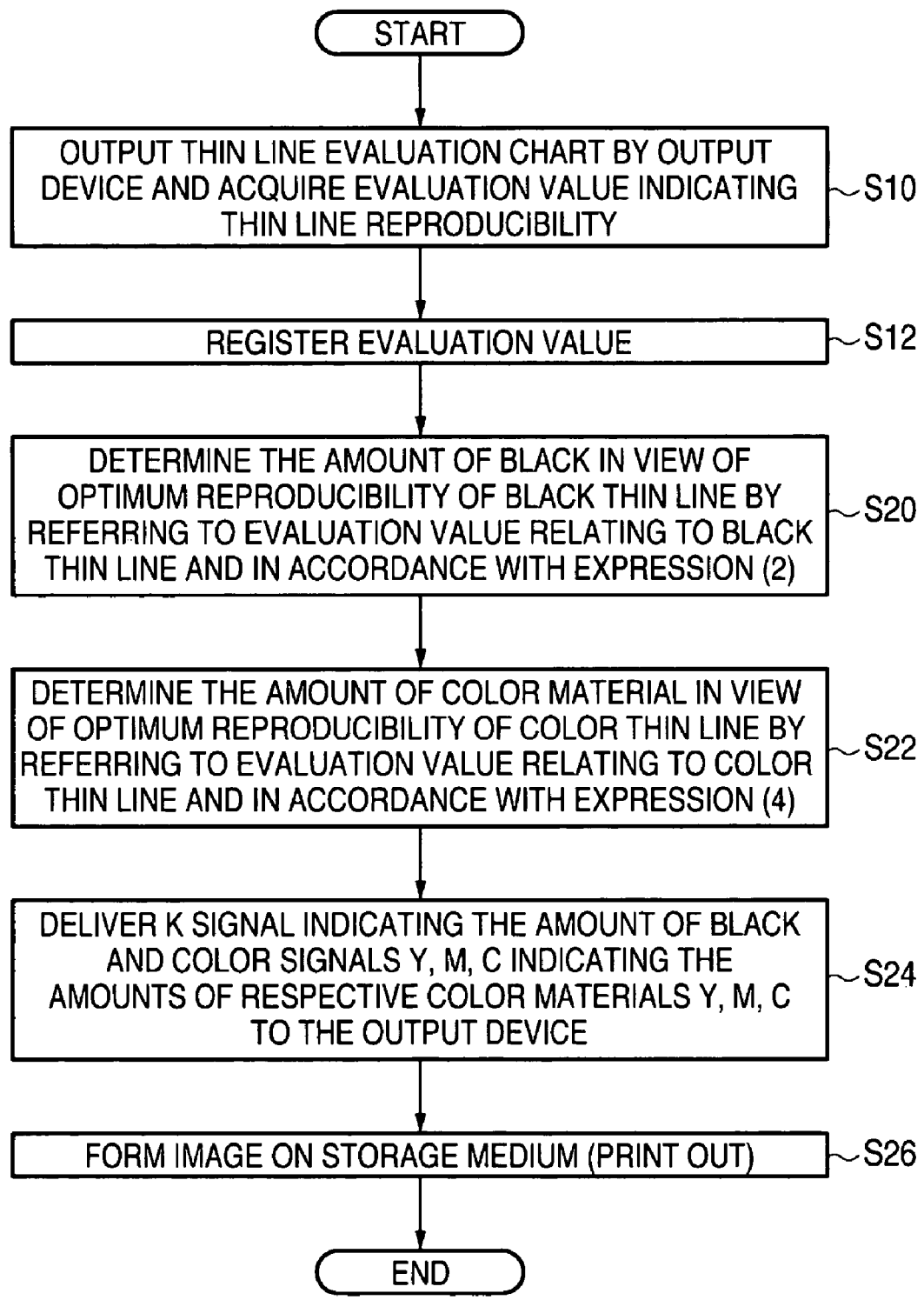
FIG. 6 is a flowchart showing the outline of a processing procedure to generate an output color signal in which importance is attached to the reproducibility of a black thin line and a color thin line.

FIG. 6 is a flowchart showing the outline of the processing procedure for generating the output color signal in which importance is attached to the reproducibility of a black thin line and a color thin line.

As a preliminary preparation, the user first outputs a test chart (hereinafter referred to as a thin line evaluation chart) for evaluating a black thin line and a color thin line by an output device, and acquires an evaluation value indicating the reproducibility of a thin line (S10). The user registers the acquired evaluation value in the thin line evaluation information storage part 50 (S12). As a mode of the registration, it is possible to adopt, for example, a mode in which the acquired evaluation value is recorded on a portable recording medium such as a flexible disk (FD) or a CD-ROM, and it is read by a read device of the image processing apparatus 1, or a mode in which the evaluation value is transmitted to the image processing apparatus 1 through a network.

Next, in the actual image processing, first, the optimum black amount determination part 46 of the image processing apparatus 1 refers to the evaluation values concerning black thin lines stored in the black thin line evaluation value storage part 52, and determines the amount of black (one of color materials) in view of the optimum reproducibility of the black thin line in accordance with the expression (2) (S20).

Next, the color difference evaluation part 49 refers to the evaluation values concerning color thin lines stored in the color thin line evaluation value storage part 54, and determines the amounts of the respective color materials of Y, M and C in accordance with the expression (4) and in view of the optimum reproducibility of the color thin line (S22).

The output color signal generation part 48 delivers, as output image signals, the K signal indicating the amount of black determined by the optimum black amount determination part 46, and the respective color signals Y, M and C indicating the amounts of the respective color materials of Y, M and C determined by the color difference evaluation part 49 to a specified output device (for example, a printer engine) (S24).

The output device forms an image on a specified recording medium (a typical example is a print sheet) based on the output color signals Y, M, C and K delivered from the output color signal generation part 48 (S26). The so-called printout is performed.

<Specific Example of Output Color Signal Generation Processing in which Importance is Attached to Thin Line Reproducibility>

Figure 7:
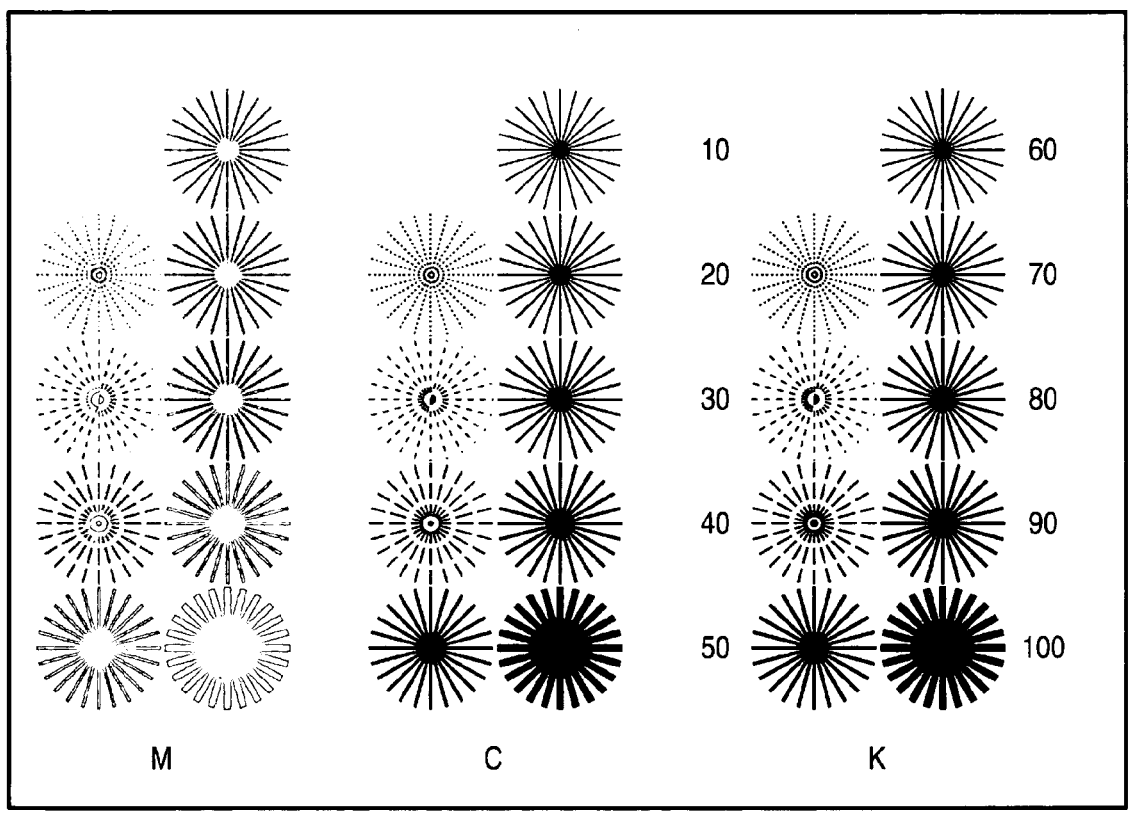
FIG. 7 is a view showing an example of a thin line evaluation chart.
Figure 8A:
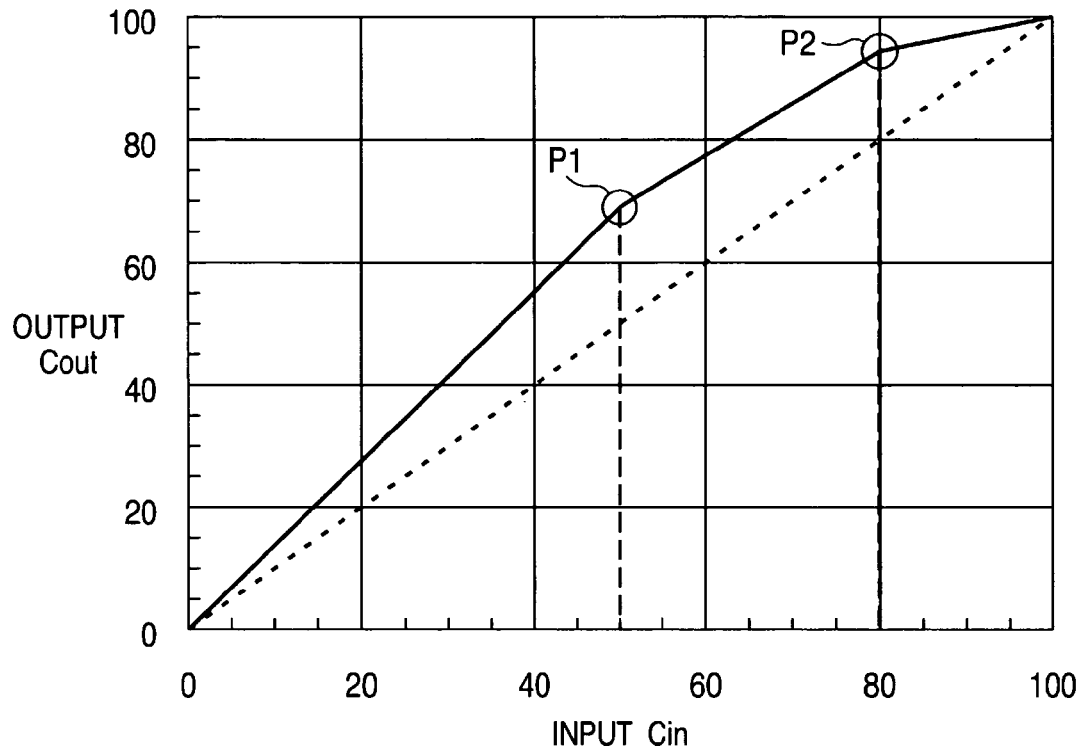
FIGS. 8A and 8B are views showing examples of thin line evaluation.
Figure 8B:
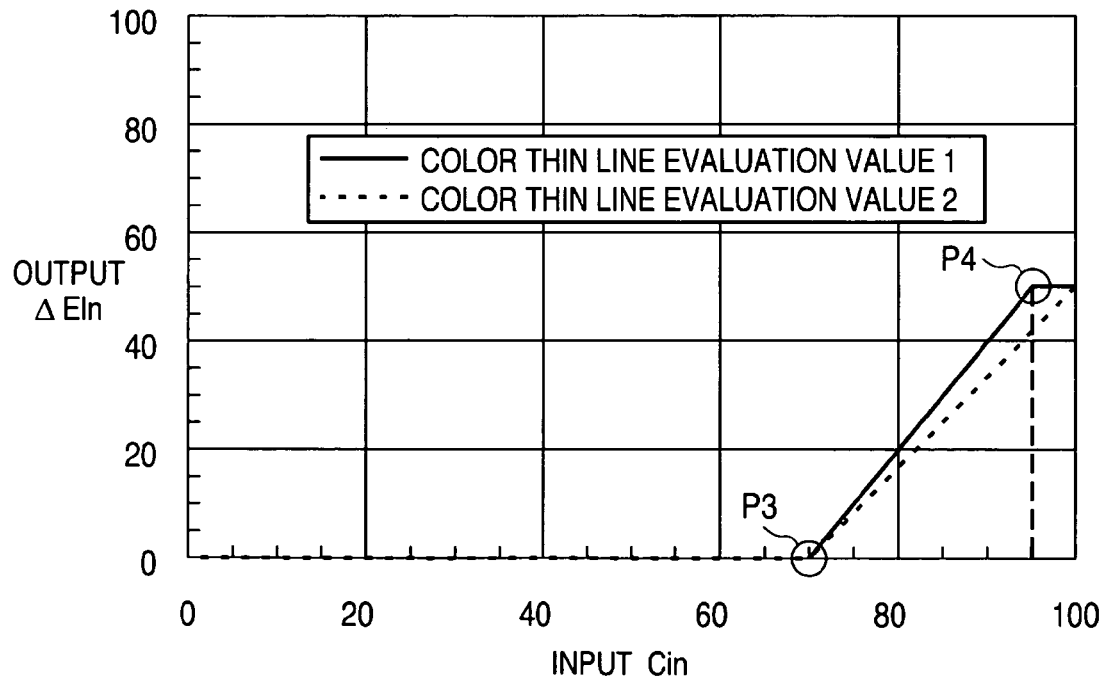

FIG. 7 and FIGS. 8A and 8B are views for explaining a specific example of generating an output color signal in which importance is attached to the reproducibility of a black thin line and a color thin line. Here, FIG. 7 is a view showing an example of a thin line evaluation chart for evaluation of the black thin line and the color thin line. FIG. 8A is a view showing an example of black thin line evaluation, and FIG. 8B is a view showing an example of color thin line evaluation.

In this embodiment, in the optimum black amount determination part 46, the amount of black in view of the reproducibility of the black thin line is determined, and in the output color signal generation part 48, in order to determine the amount of color material for YMC in view of the reproducibility of the color thin line, the reproducibility of the thin line is previously evaluated by using the thin line evaluation chart shown in FIG. 7.

In the example shown in FIG. 7, among all color material colors Y, M, C and K used by the output device, with respect to M, C and K, patterns of star shapes are shown at intervals of 10%. Incidentally, the content of the thin line evaluation chart is not limited to the star shape, and the evaluation may be performed using another desired pattern, fixed format or the like.

Here, the evaluation of each color is carried out on the concentration of 0 to 100% by the thin line reproduction at a desired step width. As the step width becomes small, the evaluation value with higher precision is obtained.

Besides, the evaluation may be carried out by each of M, C and K or by a combination of two or more colors such as CM, MK or KC. Besides, a pattern concerning Y may be contained in order to deal with all color material colors used by the output device.

As a specific evaluation method, from the K monochrome radial thin lines of the thin line evaluation chart shown in FIG. 7, the concentration at which the horizontal/vertical thin lines can be reproduced without discontinuity is first determined. For example, when the thin lines in the horizontal/vertical directions are not discontinuous at a concentration of 70%, and the horizontal/vertical thin lines are discontinuous at a concentration lower than that, the reproducible concentration of the horizontal/vertical thin lines is 70%.

For example, FIG. 8A shows an example of black thin line evaluation values. The input Cin indicated on the horizontal axis in the drawing is the achromatic amount acro_K of black indicated by the expression (2) or the maximum amount Max_K of black, and the output Cout indicated on the vertical axis is a function f relating to the achromatic amount acro_K of black indicated by the expression (2) or the maximum amount Max_K of black.

The black thin line evaluation value is obtained by determining the relation of input/output based on the output result of the thin line reproduction of black (K) from the thin line evaluation chart shown in FIG. 7. As an example, as indicated by P1 in the drawing, an object in which the vertical line and the horizontal line are clearly printed has 70%, and in the case where the line reproduction of a gray vertical line and horizontal line of 50% of the input signal is desired to be ensured, the data of Cin 50% is made to have Cout 70% and conversion is performed.

Besides, as indicated by P2 in the drawing, an object in which an oblique line of approximately 30° or 60° is clearly printed has 95%, and in the case where the reproduction of a dense gray line of 80% of an input signal is desired to be ensured, the data of Cin 80% is made to have Cout 95% and conversion is performed.

Besides, FIG. 8B shows an example of color thin line evaluation values. The input Cin indicated on the horizontal axis in the drawing is Y, M, C indicated by the expression (2), and the output ΔEln ("ln" stands for line) indicated on the vertical axis is the function f relating to Y, M, C indicated in the expression (4). As ΔEln becomes high, superiority is gained in the reproducibility of the color thin line.

Here, a color thin line evaluation value 1 shows an example of a case where the evaluation values are switched by P3 at which reproduction is performed without causing discontinuity of the vertical line and the horizontal line, and P4 at which the reproduction equivalent to the thin line of a concentration of 100% can be performed. Besides, a thin line evaluation value 2 shows an example of a case where P3 at which reproduction can be performed without causing discontinuity of the vertical line and the horizontal line, and the evaluation value of a thin line of a concentration of 100% is determined.

Incidentally, the determination method of the color thin line evaluation value shown in FIG. 8B is merely one example, and a method of previously determining an evaluation value at a specific combination (C, M, K) may be adopted, or an evaluation value may be determined as a primary function or a quadratic function of concentration values.

The user stores black thin line evaluation values obtained from the K monochrome radial thin line or the combination of two or more colors including K into the black thin line evaluation value storage part 52, and stores the color thin line evaluation values obtained from the monochrome radial thin line of each of M, C and (Y) or the combination of two or more colors containing the respective colors M, C and (Y) into the color thin line evaluation value storage part 54.

Next, in the case where the gray thin line reproduction of horizontal/vertical components expressed by the half tone of the K monochrome is desired to be ensured, the optimum black amount determination part 46 sets the minimum input concentration value, at which the reproducibility of the black thin line is desired to be ensured, to be the reproducible concentration of the horizontal/vertical thin lines, and corrects the input/output concentration conversion characteristic.

Here, the minimum input concentration value is the concentration value at which the horizontal/vertical thin lines of gray of a concentration of a certain value or more is desired to be reproduced without discontinuity, and corresponds to Cin 50% in FIG. 8A. Besides, the reproducible concentration of the horizontal/vertical thin lines corresponds to Cout 70% in FIG. 8A. The input/output concentration conversion characteristic is corrected with respect to these, so that as shown in FIG. 8A, the conversion characteristic indicated by the broken line can be raised to the P1 portion of the conversion characteristic indicated by the solid line.

By doing so, in the range where the thin line reproduction in the horizontal/vertical directions is desired to be ensured, the black thin line can be certainly reproduced without discontinuity. Besides, also with respect to an oblique line of a certain angle (for example, 30 degrees or 60 degrees), the minimum concentration at which the black thin line can be reproduced without discontinuity can be determined.

In general, it is known that as compared with the horizontal/vertical components, the thin line is apt to become discontinuous in an oblique line with an angle by the influence of a screen angle and the number of lines. Thus, in general, the minimum concentration at which the oblique black thin line can be reproduced becomes higher than the concentration at which the horizontal/vertical black thin line can be reproduced.

For example, when the reproducible concentration of the horizontal/vertical black thin line is 70%, in the oblique black thin line, the black thin line can not be reproduced unless the concentration is 95% or higher, that is, it can be considered that there arises a problem that the oblique black thin line becomes discontinuous at 95% or less.

Similarly to the case of the horizontal/vertical thin line, also with respect to the oblique line, in the case where it is necessary to ensure the reproducibility of the black thin line, the oblique black thin line reproduction guarantee minimum input concentration value (80% in FIG. 8A) is converted to the oblique thin line reproducible concentration (95% in FIG. 8A).

As described above, in the optimum black amount determination part 46, when the amount of black is determined by referring to the evaluation results relating to the reproducibility of black thin lines stored in the black thin line evaluation value storage part 52, and when the concentration conversion characteristic is determined so that the minimum black thin line reproducibility is ensured with respect to both the horizontal/vertical black thin line and the oblique black thin line, the stable reproduction becomes possible without discontinuity of the black thin line.

Besides, with respect to the thin line of the other color (Y, M, C) except the black thin line, as indicated by the expression (4), such output data that the color difference ΔE76 or ΔE94 between the Lab of the input image data and the Lab of the output image data becomes small is determined. Here, in this embodiment, a method of making the color thin line reproducibility compatible with the color reproducibility is adopted by adding the evaluation result of the color thin line reproducibility to the general determination method of YMC in which the color difference between the input image data and the output image data is made small.

Thus, here, as shown in FIG. 8B, similarly to the case of the black thin line, with respect to the input concentration Cin of each color of YMC, the concentration point P3 where the horizontal/vertical thin line can be reproduced, and the concentration point P4 where thin lines including the oblique line can be reproduced are obtained, and setting is made such that the correction value ΔEln (corresponding to f(Y, M, C) of the expression (4)) of the color difference is made "0; zero" at the input concentration of P3 or less, and the correction amount ΔEln increases at P3 or higher.

In the color difference evaluation method of this embodiment, Lab is obtained such that the evaluation value ΔEcad obtained by subtracting the color difference correction value ΔEln from ΔE76 or ΔE94 obtained by the generally used color difference calculation method becomes minimum. In other words, in the determination method of the final YMC value in this embodiment, the YMC value is determined such that the color difference (ΔE76 or ΔE94) between the objective Lab value and the Lab value calculated from the combination of YMCK becomes minimum. When the YMC value is selected from the color difference, in order to facilitate the determination of the combination of YMC values at which the reproducibility of the color thin line is enhanced, the selection is facilitated by subtracting the color difference (f(Y, M, C)) of the color thin line reproduction superiority as the correction amount from the general color difference (ΔE76 or ΔE94).

In the case where the input concentration Cin is high, as compared with the case where Cin is low, since the color thin line reproducibility is high and the discontinuity is hard to occur, the correction value (ΔEln of FIG. 8B) is subtracted from the color difference (ΔE76 or ΔE94) obtained by the same calculation method as the general method. By doing so, as the correction value ΔEln becomes large, the evaluation value ΔEcad becomes small. By defining the Cin-ΔEln characteristic in the primary color (also called YMC monochrome) represented by any one color of Y, M and C, such Lab data that the thin line of YMC monochrome is reproduced becomes easy to be selected.

Besides, as the need arises, also with respect to the thin line of the secondary color represented by the combination of two colors of Y, M and C (K may be contained), or the thin line (achromatic thin line) of the tertiary color represented by the combination of all of Y, M and C (K may be contained), by defining the Cin-ΔEln characteristic similarly, the reproducibility of the secondary color or tertiary color thin line can also be improved. Even in a pale color, or a line of an angle close to a screen angle, the disappearance of the thin line can be prevented, and the reproducibility of the color thin line can be certainly improved.

Up to here, although the invention has been described while using the embodiment, the technical scope of the invention is not limited to the range recited in the embodiment. Various modifications or improvements can be applied to the embodiment within the range not departing from the gist of the invention, and the mode in which such modifications or improvements are applied is also contained in the technical scope of the invention.

Besides, the embodiment does not limit the invention recited in the claims, and all of the combinations of the features described in the embodiment are not necessarily indispensable for the resolution means of the invention. The foregoing embodiment includes inventions at various stages, and various inventions can be extracted by the suitable combination of the disclosed plural structural elements. Even when some structural elements are deleted from all structural elements disclosed in the embodiment, as long as the effect is obtained, the structure in which the some structural elements are deleted can be extracted as the invention.

<As to the Structure Using Electronic Computer>

For example, in this embodiment, the mechanism (hereinafter also referred to as the output color signal generation processing in which importance is attached to thin line reproducibility) to generate the output color signal in view of thin line reproducibility can be constructed not only by the hardware processing circuit but also by software and by using an electronic computer (computer) based on a program code to realize the function.

Thus, a program suitable for realizing the image processing method or the image processing apparatus of the invention by using an electronic computer (computer) and by software, or a computer-readable storage medium storing the program can be extracted as the invention. By adopting the mechanism to be executed by the software, the merit that the processing procedure and the like can be easily changed without accompanying the change of hardware can be enjoyed.

In the case where the output color signal generation processing function in which importance is attached to thin line reproducibility is executed in an electronic computer by software, a program constituting the software is incorporated in dedicated hardware of a computer (built-in microcomputer) or the program is installed from a storage medium to an SOC (System On a Chip) in which functions of a CPU (Central Processing Unit), a logical circuit, and a storage device are mounted on one chip to realize a desired system, or to a general-purpose personal computer in which various programs are installed so that various functions can be executed.

The storage medium causes a reader provided in the hardware resource of a computer to have a changing state of energy, such as magnetism, light or electricity, according to the description content of the program, and can transfer the description content of the program to the reader in the format of signals corresponding thereto.

For example, the configuration may be made of, in addition to a computer, a package medium (portable storage medium) to be distributed to provide a program to a user, such as a magnetic disk (including a flexible disk FD) on which the program is recorded, an optical disk (including a CD-ROM (Compact Disc-Read Only Memory) and a DVD (Digital Versatile Disc)), a magneto-optical disk (including an MD (Mini Disc)), or a semiconductor memory, or the configuration may be made of a ROM or a hard disk in which the program is recorded and which is provided to the user in the state where it is previously incorporated in the computer.

Besides, the program constituting the software may not be necessarily provided through the storage medium, without using the storage medium, but may be provided through a wired or wireless communication network.

For example, the storage medium storing the program code of the software to realize the output color signal generation processing function in which importance is attached to thin line reproducibility is supplied to a system or an apparatus, and also when the computer (or CPU or MPU) of the system or the apparatus reads and executes the program code stored in the storage medium, the effect similar to the case where the configuration is made of the hardware processing circuit can be achieved. In this case, the program code itself read from the storage medium realizes the function of the output color signal generation processing in which importance is attached to thin line reproducibility.

Besides, in addition to the case where the function to perform the output color signal generation processing in which importance is attached to thin line reproducibility is realized by executing the program code read by the computer, the OS (Operating System; basic software) operating on the computer performs a part of or all of actual processing based on the instructions of the program code, and the function to perform the output color signal generation processing in which importance is attached to thin line reproducibility may be realized through the processing.

Further, after the program code read from the storage medium is written in a function expansion card inserted in the computer or a memory equipped in a function expansion unit connected to the computer, the function expansion card or the CPU provided in the function expansion unit performs a part of or all of the actual processing based on the instructions of the program code, and the function to perform the output color signal generation processing in which importance is attached to thin line reproducibility may be realized through the processing.

Incidentally, although the program is provided as the file describing the program code to realize the function of performing the output color signal generation processing in which importance is attached to thin line reproducibility, in this case, in addition to the case where the program is provided as a package program file, it may be provided as individual program modules according to the hardware structure of the system constructed by the computer.

Figure 9:
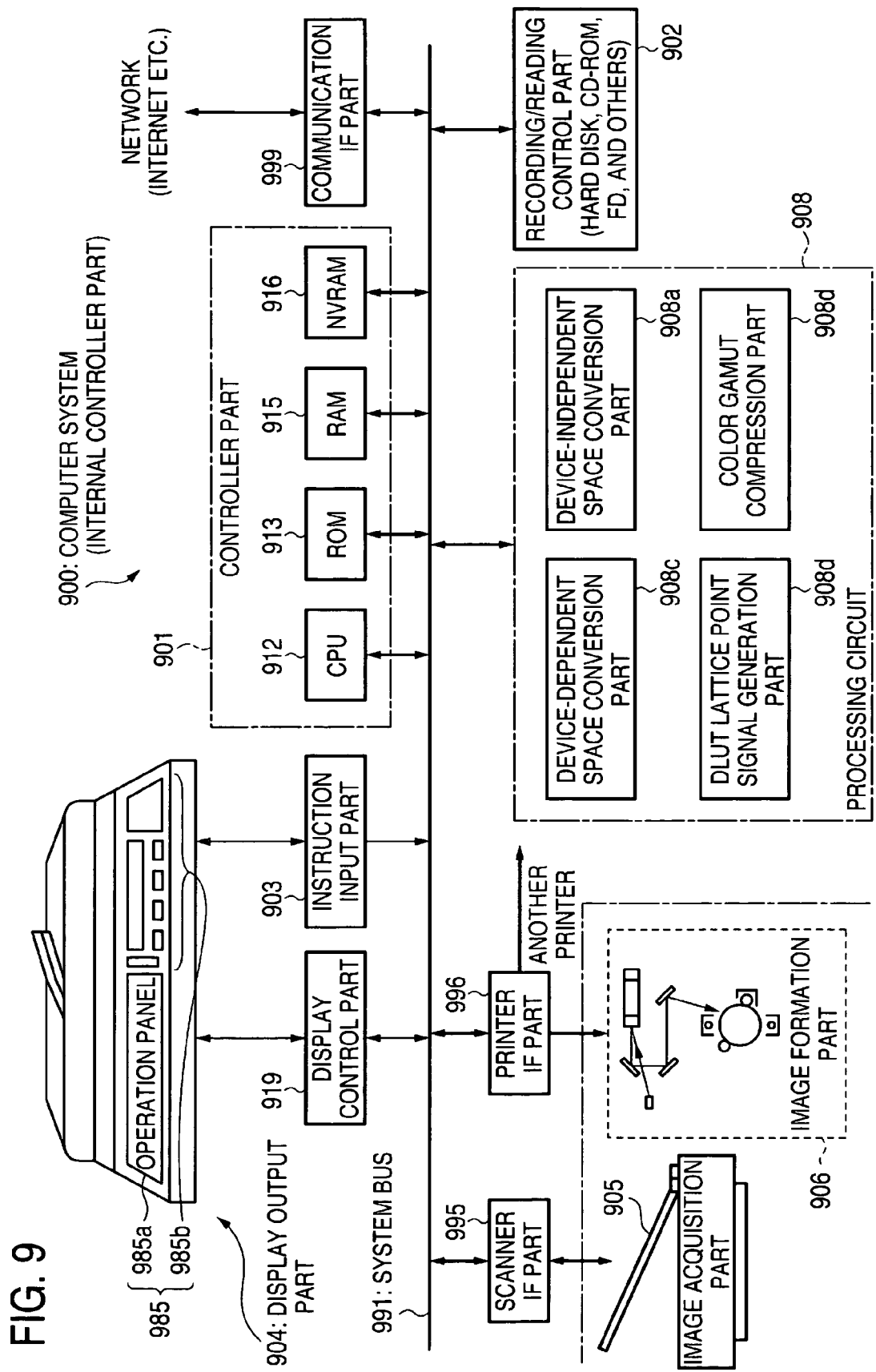
FIG. 9 is a block diagram showing an example of a hardware structure in a case where an image processing is realized by using the function of a computer and by software.

For example, FIG. 9 is a block diagram showing an example of a hardware structure in the case where the image processing apparatus 1 is constructed which has the function to perform the output color signal generation processing in which importance is attached to thin line reproducibility by using a CPU and a memory and by software, that is, the output color signal generation processing in which importance is attached to thin line reproducibility is realized by using the function of the computer (electronic calculator), such as a personal computer, and by software.

Of course, in addition to the structure using the computer as stated above, the image processing apparatus to perform the output color signal generation processing in which importance is attached to thin line reproducibility can also be constructed by the combination of the dedicated hardware to perform the processing of each function part shown in FIG. 1. When the mechanism to execute the processing by software is adopted, the merit that the processing procedure or the like can be easily changed without changing the hardware can be enjoyed.

Incidentally, in the case of a mode in which the output signal generation processing function in which importance is attached to thin line reproducibility is incorporated in a compound machine, software similar to a conventional image processing apparatus (compound machine), such as a copying application, a printer application, a facsimile (FAX) application, or a processing program for another application, is incorporated in the electronic computer shown in FIG. 9. Besides, a control program for transmitting/receiving data to/from the outside through the network is also incorporated.

At this time, although the program is provided as the file in which the program code to realize the output color signal generation processing function in which importance is attached to thin line reproduction is described, in this case, in addition to the case where the program is provided as a package program file, it may be provided as individual program modules according to the hardware structure of the system constructed by the computer. For example, it may be provided as add-in software incorporated in the existing copying apparatus control software or printer control software (printer driver).

For example, a computer system 900 includes a controller part 901 and a recording/reading control part 902 for reading/storing data from/to a specified storage medium such as a hard disk device, a flexible disk (FD) drive, a CD-ROM (Compact Disk ROM) drive, or a semiconductor memory controller.

The controller part 901 includes a CPU (Central Processing Unit) 912, a ROM (Read Only Memory) 913 as a read only storage part, a RAM (Random Access Memory) 915 which can write and read at any time and is an example of a volatile storage part, and a RAM (written as NVRAM) 916 as an example of a nonvolatile storage part.

For example, when evaluation results of black thin lines or color thin lines are stored in the NVRAM 916, this NVRAM 916 can be made to function as the thin line evaluation information storage part 50.

Incidentally, in the above, the "volatile storage part" means a storage part of a mode in which in the case where the power source of a device is turned off, the stored content is erased. On the other hand, the "nonvolatile storage part" means a storage part of a mode in which even in the case where the main power source of a device is turned off, the storage content is continued to he held. Any storage part may be used as long as the stored content can be continued to be held, and in addition to one in which a semiconductor memory element itself has nonvolatility, the structure may be made such that a volatile memory element is made to exhibit "nonvolatility" by providing a backup power source. Besides, in addition to the structure including the semiconductor memory element, the structure may use a medium such as a magnetic disk or an optical disk. For example, the hard disk device can be used as the nonvolatile storage part. Besides, the structure to read information from a storage medium such as a CD-ROM can also be used as the nonvolatile storage part.

Besides, the computer system 900 includes an instruction input part 903 as a function part of a customer interface, a display output part 904 to exhibit specified information, such as a guidance screen at the time of operation and processing results, to a customer, and an interface part (IF part) 909 as an interface function between the respective function parts.

Incidentally, in order to form the structure of the compound machine, there are also provided an image read part (scanner unit) 905 to read an image of a processing object, and an image formation part 906 to output a processed image to a specified output medium (for example, a print sheet).

As the instruction input part 903, for example, an operation key part 985*b* of a user interface part 985 can be used. Alternately, a keyboard, a mouse or the like can also be used.

The display output part 904 includes a display control part 942 and a display device. As the display device, for example, an operation panel part 985*a* of the user interface part 985 can be used. Alternately, another display part made of a CRT (Cathode Ray Tube), an LCD (Liquid Crystal Display) or the like can also be used.

For example, the display control part 942 displays the guidance information or the whole image captured by the image read part 905 on the operation panel part 985*a* or the display part. Besides, it is also used as a display device when various information is notified to the user. Incidentally, when the display part having a touch panel on the display plane is formed, the instruction input part 903 to input specified information by a fingertip or a pen can also be constructed.

The interface part 909 includes, in addition to a system bus 991 as a transfer passage of processing data (including image data) and control data, for example, a scanner IF part 995 functioning as an interface to the image read part 905, a printer IF part 996 functioning as an interface to the image formation part 906 or another printer, and a communication IF part 999 to mediate the delivery of communication data to a network such as the Internet.

In the structure as stated above, the CPU 912 controls the whole system through the system bus 991. The ROM 913 stores the control program of the CPU 912, and the like. The RAM 915 is constructed of an SRAM (Static Random Access Memory) or the like, and stores program control variables, data for various processings and the like. Besides, the RAM 915 includes an area for temporarily storing an electric document (which may include not only character data but also image data) acquired by a specified application program, image data acquired by the image read part 905 provided in the apparatus, electric data acquired from the outside and the like.

For example, the program to cause the computer to execute the output signal generation processing function in which importance is attached to thin line reproducibility is distributed through the storing medium such as a CD-ROM. Alternately, this program may be stored in an FD, not a CD-ROM. Besides, an MO drive is provided, and the program may be stored in the MO, or the program may be stored in another storage medium such as a nonvolatile semiconductor memory card such as a flash memory. Further, the program may be downloaded and acquired through the network such as the Internet from another server or may be updated.

Incidentally, as the storing medium for providing the program, in addition to the FD or CD-ROM, an optical storage medium such as a DVD, a magnetic storage medium such as an MD, a magneto-optical storage medium such as a PD, a tape medium, a magnetic storage medium, or a semiconductor memory such as an IC card or a miniature card can be used.

Partial or all functions to realize the output color signal generation processing function in which importance is attached to thin line reproducibility can be stored in the FD or the CD-ROM as an example of the storage medium.

Besides, the hard disk device includes an area in which data for various processings by the control program are stored, or a large amount of image data acquired from the image read part 905 or print data acquired from the outside are temporarily stored. Besides, the hard disk device, the FD drive, or the CD-ROM drive is used to register, for example, program data for causing the CPU 912 to execute the processing of content acquisition, address acquisition, or address setting by software.

Incidentally, instead of performing, by software, all processings of the respective function portions for the output color signal generation processing in which importance is attached to thin line reproducibility, a processing circuit 908 to perform a part of these function portions by dedicated hardware may be provided. Although the mechanism to perform processing by software can flexibly deal with a parallel processing or a continuous processing, as the processing becomes complicated, the processing time becomes long, and the reduction in processing speed becomes a problem. On the other hand, when the processing is performed by the hardware processing circuit, an accelerator system to realize speed-up can be constructed. Even if the processing is complicated, the accelerator system can prevent the reduction in the processing speed, and a high throughput can be obtained.

For example, in the case of the illustrated mode where the output color signal processing function in which importance is attached to thin line reproducibility is applied to the compound machine, as the processing circuit 908, a device-independent space conversion part 908a corresponding to the device-independent space conversion part 10 shown in FIG. 1, a color gamut compression part 908b corresponding to the color gamut compression part 20, a device-dependent space conversion part 908c corresponding to the device-dependent space conversion part 30, and a DLUT lattice point signal generation part 908d corresponding to the DLUT lattice point signal generation part 60 may be constructed by hardware.

As described above, some embodiments of the invention are outlined below. In the mechanism according to an aspect of the invention, in a process in which an input color signal is processed and an output color signal is generated, with respect to a line segment constituting an input image, an evaluation concerning reproducibility of this line segment in an output image is added and the output color signal is generated. In summary, the output color signal in which the thin line reproducibility is added is generated.

Besides, according to another aspect of the invention, specific examples of the mechanism of the image processing are recited.

Incidentally, the mechanism of the image processing according to another aspect of the invention can also be realized by using an electronic computer (computer) and by software, and a program for that or a storage medium storing the program can also be extracted as the invention. For example, it may be provided as a printer driver for an image forming apparatus. The program may be provided while it is stored on a computer-readable storage medium, or may be provided by distribution through a wired or wireless communication unit.

According to another aspect of the invention, in the process of generating the output color signal for reproducing an output image, the evaluation concerning the reproducibility of the line segment in the output image is added and the output color signal is generated. By this, the thin line, which could not be reproduced at a satisfactory level due to the occurrence of discontinuity or a jaggy, can be reproduced at a satisfactory level (accurately).

Also, the color signal to satisfy both the thin line reproducibility and the color reproducibility can be generated, and the amount of black by which the color gamut becomes maximum while the coverage limitation is satisfied and other color materials can be determined so that the thin line does not disappear. For example, the amount of black is determined so that the color gamut can be widely reproduced to the maximum, and the reproduction of the thin line is enabled, and when the output concentrations of the respective colors are determined, the output concentration can be determined for each output color in view of the thin line reproducibility.

Further, some embodiments of the invention are summarized below.

An image processing method for generating an output color signal to reproduce an output image corresponding to an input image includes evaluating reproducibility of a line segment in the output image, and generating the output color signal based on the evaluation.

An image processing apparatus for generating an output color signal to generate an output image corresponding to an input image by processing an input color signal that represents the input image includes a signal processing part that evaluates reproducibility of a line segment in the output image and generates the output color signal.

In the image processing apparatus, the output color signal may be calculated so that a color difference between the input color signal and the output color signal is smaller and generated.

In the image processing apparatus, an amount of black included in the output color signal is calculated so that a coverage limitation is satisfied and a color gamut becomes largest.

In the image processing apparatus, first pairs of a plurality of color signals which belong to a partial color space expressed by at least three colors and corresponding optimum amounts of black may be generated, second pairs of a plurality of color signals which belong to a curved surface expressed by four colors containing black and satisfying coverage limitation and corresponding optimum amounts of black may be generated, a model may be created based on the first pairs and the second pairs, the optimum amount of black corresponding to the input color signal may be predicted based on the model, three colors except the black may be predicted based on the predicted optimum amount of black, the reproducibility of the black line segment may be evaluated, and a four-color output signal containing the black may be calculated.

In the image processing apparatus, the output color signal is generated based on the reproducibility of the line segment of at least one color material among three colors except the black The image processing apparatus may further include a thin line evaluation information storage part to store information of the reproducibility of the line segment, wherein the signal processing part generates the output color signal based on the information.

In the image processing apparatus, the thin line evaluation information storage part may store relation information of the input color signal and the output color signal in which black line segment is reproduced without discontinuity, and the relation is based on an output result of a black line segment evaluation object including a half tone.

In the image processing apparatus, the thin line evaluation information storage part stores relation information of the input color signal and the output color signal with respect to color line segment reproduction, and the relation information is based on an output result of a color line segment evaluation object including a half tone.

In the image processing apparatus, The image processing apparatus according to claim 9, wherein the color line segment reproduction is based on input signal of one of Y, M, or C, or input signal including combination of a plurality of color of Y, M, or C.

The image processing apparatus may further include a color difference evaluation part to calculate the output color signal in which a color difference between the input color signal and the output color signal becomes smaller, wherein the signal processing part generates the output color signal using at least one of three colors except black based on the calculation.

In the image processing apparatus, the color difference evaluation part calculate the output color signal based on a value obtained by subtracting an evaluation value which represents the reproducibility of the line segment in the output image from the color difference between the output color signal and input color signal.

A storage medium readable by a computer stores a program of instructions executable by the computer. The program causes the computer to perform a function including evaluating reproducibility of the line segment in the output image constituting the input image, and generating the output color signal based on the evaluation.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire description of Japanese Patent Application No. 2005-078795 filed on Mar. 18, 2005 and U.S. patent application Ser. No. 09/838266 filed on Apr. 20, 2001 including specification, claims, drawings and abstract are incorporated herein by reference in its entirety.

What is claimed is:

1. An image processing method for generating an output color signal to reproduce an output image corresponding to an input image, comprising:
   evaluating reproducibility of a line segment in the output image;
   calculating the output color signal in which a color difference between the input color signal and the output color signal becomes smaller, the output color signal being calculated based on a value obtained by subtracting an evaluation value which represents the reproducibility of the line segment in the output image from the color difference between the output color signal and input color signal,
   generating the output color signal based on the output color signal being calculated, the output color signal being generated using at least one of three colors except black.

2. An image processing apparatus for generating an output color signal to generate an output image corresponding to an input image by processing an input color signal that represents the input image, comprising:
   a signal processing part that evaluates reproducibility of a line segment in the output image and generates the output color signal; and
   a color difference evaluation part to calculate the output color signal in which a color difference between the input color signal and the output color signal becomes smaller,
   wherein the color difference evaluation part calculates the output color signal based on a value obtained by subtracting an evaluation value which represents the reproducibility of the line segment in the output image from the color difference between the output color signal and input color signal, and
   wherein, based on the calculation, the signal processing part generates the output color signal using at least one of three colors except black.

3. The image processing apparatus according to claim 2, wherein the output color signal is calculated so that a color difference between the input color signal and the output color signal is smaller and generated.

4. The image processing apparatus according to claim 3, wherein an amount of black included in the output color signal is calculated so that a coverage limitation is satisfied and a color gamut becomes largest.

5. The image processing apparatus according to claim 4, wherein in the signal processing part,
   first pairs of a plurality of color signals which belong to a partial color space expressed by at least three colors and corresponding optimum amounts of black are generated,
   second pairs of a plurality of color signals which belong to a curved surface expressed by four colors containing black and satisfying coverage limitation and corresponding optimum amounts of black are generated,
   a model is created based on the first pairs and the second pairs,
   the optimum amount of black corresponding to the input color signal is predicted based on the model,
   three colors except the black are predicted based on the predicted optimum amount of black,
   the reproducibility of the black line segment is evaluated, and
   a four-color output signal containing the black is calculated.

6. The image processing apparatus according to claim 3, wherein the output color signal is generated based on the reproducibility of the line segment of at least one color material among three colors except the black.

7. The image processing apparatus according to claim 2, further comprising a thin line evaluation information storage part to store information of the reproducibility of the line segment,
   wherein the signal processing part generates the output color signal based on the information.

8. The image processing apparatus according to claim 7, wherein the thin line evaluation information storage part stores relation information of the input color signal and the output color signal in which black line segment is reproduced without discontinuity, and the relation is based on an output result of a black line segment evaluation object including a half tone.

9. The image processing apparatus according to claim 7, wherein the thin line evaluation information storage part stores relation information of the input color signal and the output color signal with respect to color line segment reproduction, and the relation information is based on an output result of a color line segment evaluation object including a half tone.

10. The image processing apparatus according to claim 9, wherein the color line segment reproduction is based on input signal of one of Y, M, or C, or input signal including combination of a plurality of color of Y, M, or C.

11. A storage medium readable by a computer, the storage medium storing a program of instructions executable by the computer to perform an image processing to generate an output color signal to reproduce an output image corresponding to an input image by processing an input color signal to express the input image,
wherein
the program causes the computer to function as a signal processing part that:
evaluates reproducibility of the line segment in the output image constituting the input image to generate the output color signal;
calculates the output color signal in which a color difference between the input color signal and the output color signal becomes smaller, and
generates the output color signal using at least one of three colors except black based on the calculation,
wherein the output color signal is calculated based on a value obtained by subtracting an evaluation value which represents the reproducibility of the line segment in the output image from the color difference between the output color signal and input color signal.

12. The storage medium according to claim 11, wherein the output color signal is generated based on the reproducibility of the line segment of at least one color material among three colors except the black.

13. The recording medium according to claim 11, the program further causing the computer to comprise the following functions:
storing information of the reproducibility of the line segment, and
generating the output color signal based on the information.

14. The recording medium according to claim 13, wherein the information of the reproducibility is relation information of the input color signal and the output color signal in which black line segment is reproduced without discontinuity, and the relation is based on an output result of a black line segment evaluation object including a half tone.

15. The recording medium according to claim 13, wherein the information of the reproducibility is relation information of the input color signal and the output color signal with respect to color line segment reproduction, and the relation information is based on an output result of a color line segment evaluation object including a half tone.

16. The recording medium according to claim 15, wherein the color line segment reproduction is based on input signal of one of Y, M, or C, or input signal including combination of a plurality of color of Y, M, or C.

* * * * *